Dec. 11, 1945.  C. G. BARRETT  2,390,913
INLET AND EXHAUST CONNECTIONS FOR INTERNAL-COMBUSTION ENGINES
Filed Nov. 30, 1942  3 Sheets-Sheet 3
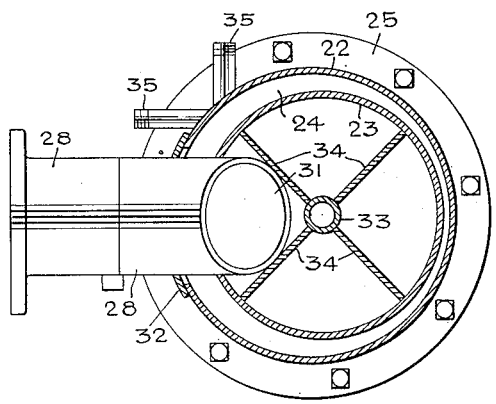
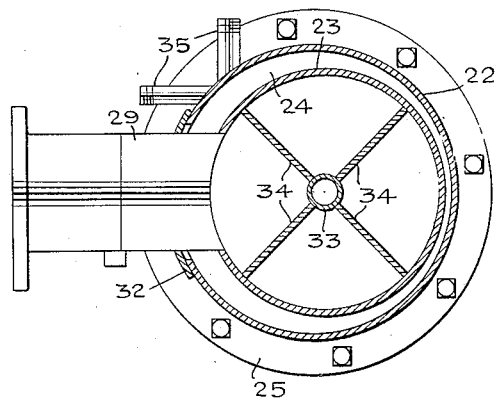
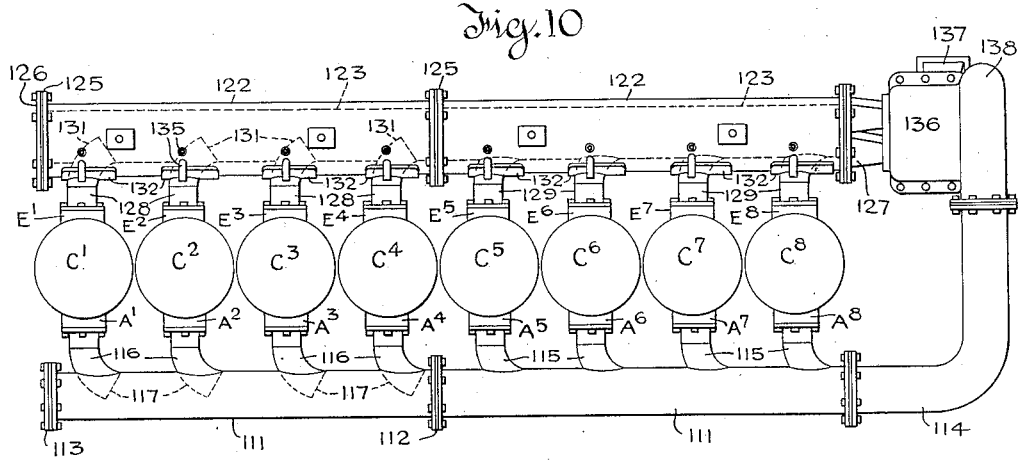
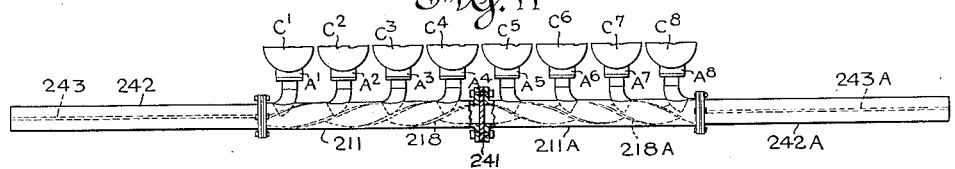
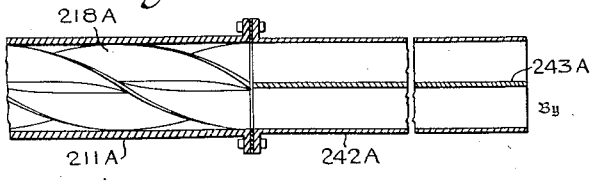
Inventor
Charles G. Barrett
By Dodge and Ihm
Attorneys Patented Dec. 11, 1945

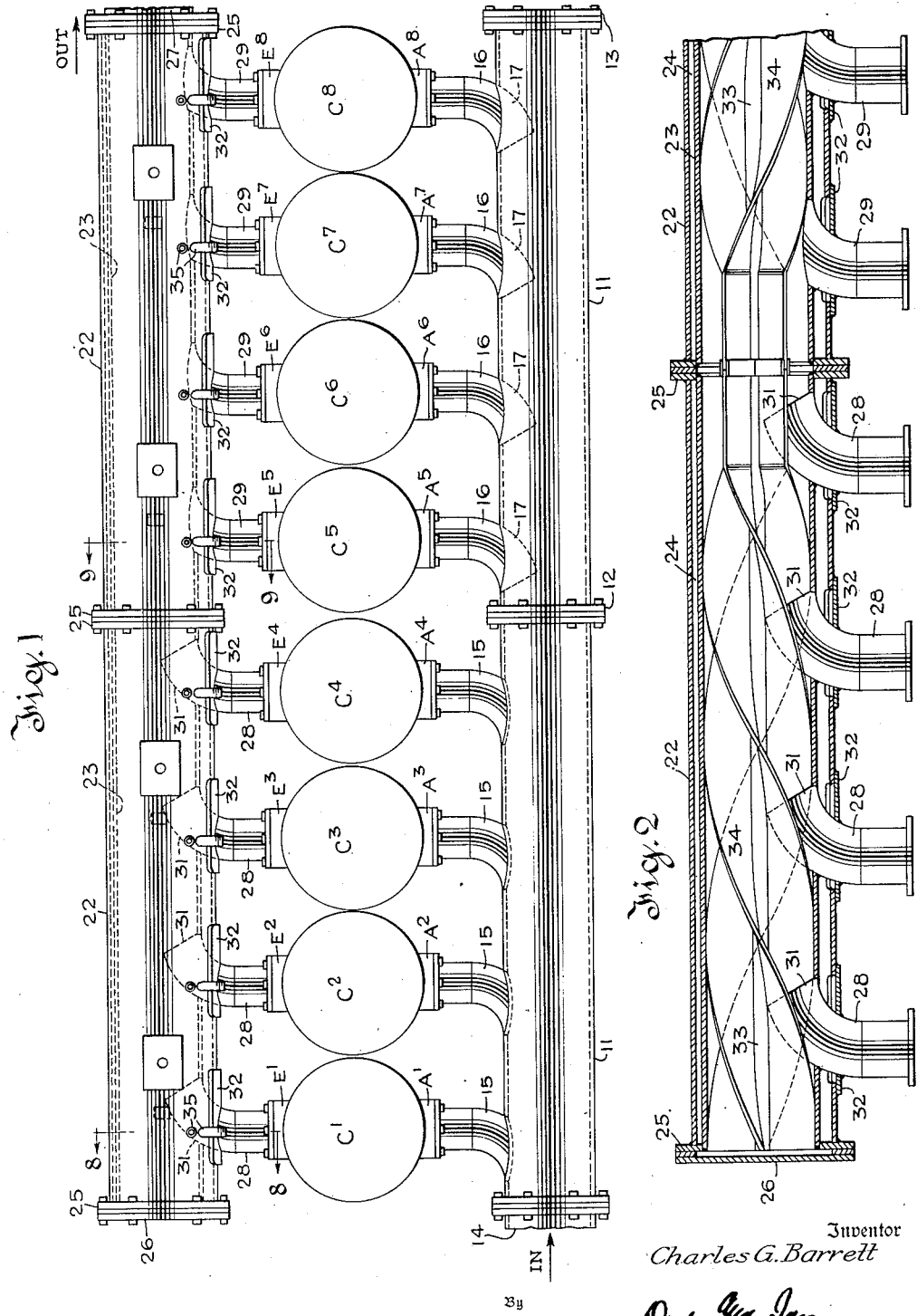

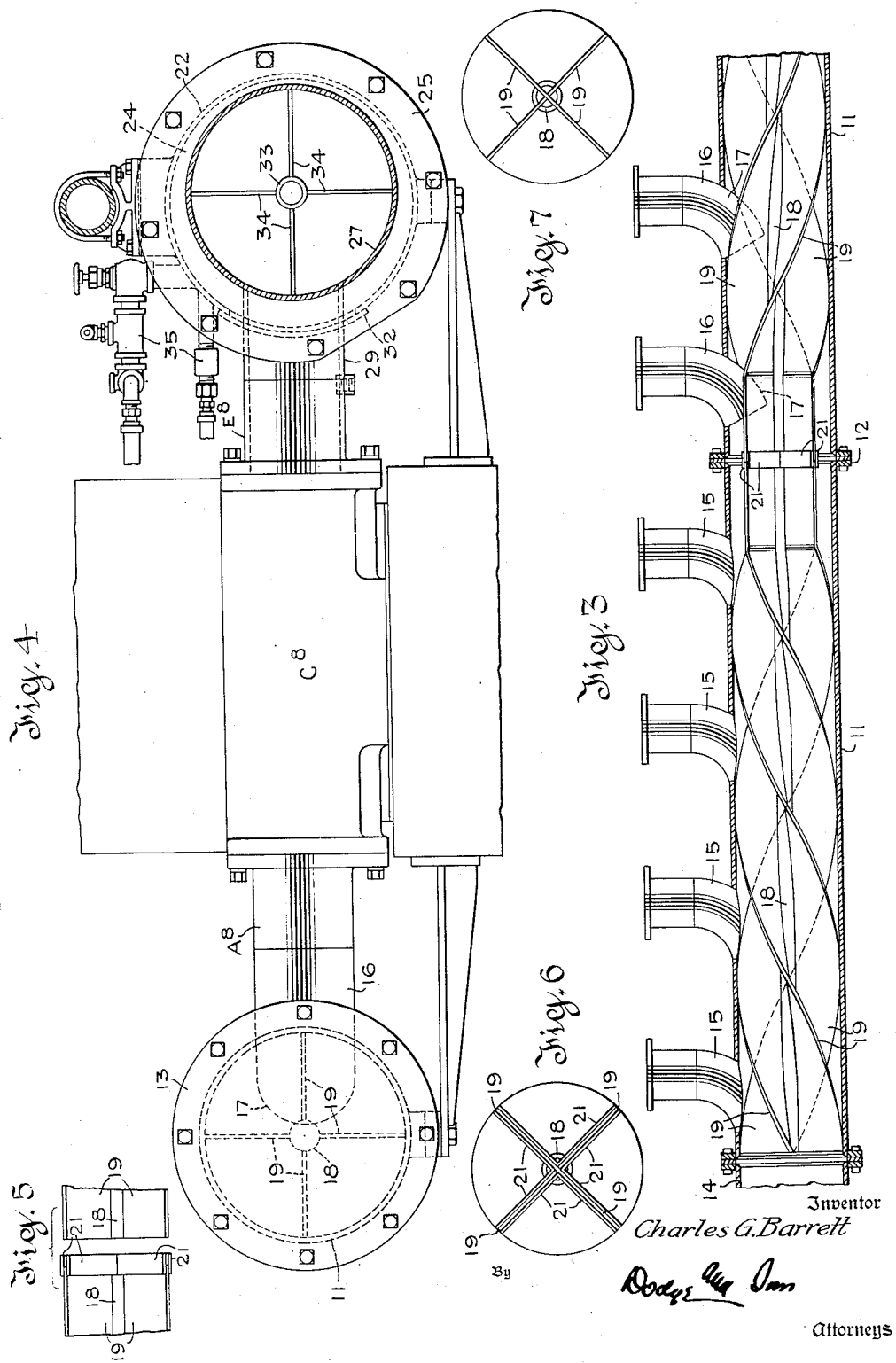

2,390,913

UNITED STATES PATENT OFFICE 2,390,913

INLET AND EXHAUST CONNECTIONS FOR INTERNAL-COMBUSTION ENGINES

Charles G. Barrett, Alexandria, Va., assignor to himself and Edward C. Magdeburger, as trustees Application November 30, 1942, Serial No. 467,390

20 Claims. (Cl. 60—13)

This invention relates to inlet and exhaust connections for engines of the multi-cylinder internal combustion type and particularly those in which there is fuel injection with sustained combustion and air scavenging, for example, Diesel engines.

With such engines the advantages of supercharging are well established, and turbo-chargers (such as the Büchi supercharger) are now in extensive use.

However, both with and without a supercharger, it is possible to improve performance by using lengthened inlet passages of suitable cross sectional area which are individual at least to the extent that a single passage never feeds two inlet valves whose open periods materially overlap. This action can be still further improved by using lengthened and properly proportioned exhaust passages which are individual at least to the same extent, i. e., a single passage never receives exhaust from two exhaust valves whose open periods materially overlap.

A simple undivided manifold is characterized by cross-flows which absorb and waste energy, whether the flows are of inlet air, or exhaust gases. Individual exhaust passages, if of sufficient length, avail of the kinetic energy of the flowing exhaust gases to reduce the final cylinder pressure. The same principle applied to the inlet manifold can be made to give a mild degree of supercharging without a supercharger, and can be made to improve the performance of a supercharger.

When the principle is applied to both inlet and exhaust, the resulting intensified flow which occurs during the scavenging interval involves a useful interaction of the improved inlet and discharge connections which can be availed of by adoption of suitable relative proportions.

The provision of easily manufactured multiple passaged inlet and exhaust connections for engines having cylinders in line is a troublesome problem, because the firing order determines the cylinders which can be connected to a single passage, and manufacturing conditions require the various connections to be the same, or nearly so.

According to the present invention in its preferred form, recourse is had to a manifold or shell which is sub-divided by an insert having helicoidal vanes, whose pitch is a function of cylinder spacing. The resulting helical flow is believed to improve the over-all performance.

The firing order in four-cycle engines makes it desirable to reverse the direction of the helical pitch of the vanes at mid-length. Such reversal is not ordinarily necessary with two-cycle engines. It is preferred that not more than two cylinders should connect with a single passage in either two-cycle or four-cycle engines, though three cylinders can be connected without seriously objectionable results.

In the present application, no claim is made to helicoidal subdivision of a manifold, broadly considered, but certain details of construction for accomplishing this are a part of the invention and will be claimed.

No details of inlet or exhaust valve mechanism or timing are here illustrated as these may follow known practice. For an adequate discussion of Büchi practice, reference may be made to Büchi's article in A. S. M. E. Transactions for February, 1937, "Supercharging of internal combustion engines with blowers driven by exhaust-gas turbines."

A preferred embodiment of the invention will now be described by reference to the accompanying drawings.

Fig. 1 is a plan view of an engine having eight cylinders in line and having the improved inlet air and exhaust manifold arrangement.

Fig. 2 is a horizontal axial section of the exhaust manifold shown in Fig. 1.

Fig. 3 is a similar section of the inlet air manifold of Fig. 1.

Fig. 4 is a fragmentary elevation of the right hand end of the engine shown in Fig. 1.

Fig. 5 is a fragmentary view in side elevation (on a reduced scale) illustrating the joint between the two halves of the helical insert.

Figs. 6 and 7 are end elevations of the two mating portions which appear in Fig. 5.

Figs. 8 and 9 are transverse sections through the exhaust manifold taken on the lines 8—8 and 9—9 respectively, of Fig. 1.

Fig. 10 is a view similar to Fig. 1 showing the application of a turbo-charger. In this view both manifolds are helically divided as indicated in Figs. 1, 2 and 3, but the inlet air manifold is reversed, end for end, so that the open ends of both manifolds are at the same end of the engine.

Fig. 11 is a fragmentary plan showing a preferred inlet arrangement when no supercharger is used.

Fig. 12 is a fragmentary axial section of the inlet manifold and connected inlet extension.

Referring first to Figs. 1 to 9 inclusive, the eight cylinders of the engine are indicated diagrammatically at $C^1$ to $C^8$ inclusive, the inlet air connections at $A^1$ to $A^8$ inclusive and the exhaust connections at E¹ to E⁸ inclusive. The air inlet manifold which is shown in section in Fig. 3 is made up of two halves bolted together, that is to say, there are two aligned shells 11 which have a flange connection indicated at 12. At one end (the right in Fig. 1) there is a cap plate or closure 13. At the other end there is an air connection 14 which may lead from the atmosphere or any pump suited to furnish inlet air including a supercharger or a turbo-charger such as that discussed hereinafter in Fig. 10.

The two shells 11 which make up the inlet manifold are essentially similar. The only difference between them is that the branch connections 15 on the half of the manifold nearer the air inlet connection 14 are connected flush with the shell whereas the connections 16, with that of the manifold which is remote from the air inlet connection, have scoops or curved extensions 17 which project into the manifold shell and approximately fit the helical passages into which they project. In the example illustrated, two cylinders will be connected to each exhaust passage in the manifold.

The means for sub-dividing the interior of the manifold into separate helical passages comprises an insert having a central core 18 with four radial vanes 19 which are helicoidal in form. The inserts in the two portions 11 of the manifold shell are of opposite helical pitch in the example illustrated. That in the left hand section is shown left handed, and that in the right hand section is shown right handed. It could be the other way round. The reversal of direction of pitch is desirable in a four cycle engine such as that illustrated in Figs. 1 to 8, so that its cylinders C¹ and C⁸ can be connected to one passage, C² and C⁷ to another, C³ and C⁶ to another and C⁴ and C⁵ to another. This permits use of the preferred firing order.

It is simple to design the vanes of the two inserts so that for a short distance adjacent their junction they extend radially and axially. This makes it conveniently possible to use a very simple tongue and groove joint between the two inserts. The groove is produced by welding flange plates 21 to the vanes as indicated in Figs. 5 and 6. The insert in the left hand section of Fig. 3 can simply be pushed into place through either end of the shell. That in the right hand section in the same figure can be positioned by giving it a rotary motion as it is advanced axially. In this way it is possible to clear the extensions 17.

The exhaust manifold is similar to the air inlet manifold except that it is water jacketed. The manifold comprises an outer shell 22 and an inner shell 23 spaced therefrom to afford a water space 24. The two are connected together by flange rings 25 at the ends and these flange rings at midlength of the manifold serve as a means for connecting the two sections together. The left hand end as viewed in Fig. 2 has a closure cap 26 and the right hand end communicates with the exhaust pipe 27. The manner of interposing a turbo-charger will be explained with reference to Figure 10.

For an eight cylinder engine there are four exhaust branches 28 on the left hand section and four exhaust branches 29 on the right hand section. These connections like the connections 15 and 16 differ in that the connections 28, remote from the exhaust pipe 27, have the curved extension 31 whereas those in the other section are welded flush as clearly shown in Fig. 2.

Connections 28 are welded to closure plates 32 which cover apertures in the outer shell 22 and are welded to the shell. These apertures are formed to permit welding of the connections to the inner shell 23. After the connections to the inner shell have been welded, the cover plates 32 are welded to the connections and also to the outer shell 22. The inserts used in the exhaust connections are identical with those in the inlet air connections, that is to say, they have the central core 33 and the helical vanes 34, the two inserts are of opposite pitch and they are joined exactly as has been described with reference to Figs. 5 to 7.

The connections indicated generally at 35, in Fig. 4, permit circulation of water through the jacket space 24 and need not be elaborated. These connections may communicate with the water jackets of the cylinders or any other suitable arrangement may be made.

Figure 10, which shows a minor modification, illustrates an eight cylinder engine and here again the parts of the engine, i. e., the cylinders, the air inlet connections, and the exhaust connections, are lettered as in Fig. 1. The numbered parts which correspond to numbered parts in Fig. 1 are given the same reference numerals increased by 100. In the arrangement of Fig. 10, the air inlet connection 114 and the discharge connections 127 are desirably placed at the same end of the engine to simplify the piping. To permit this, all that is really necessary is to turn the inlet manifold of Fig. 3 end for end. This brings the curved extensions 17 which are to the right in Fig. 1 to the left in Fig. 10.

The helical vanes do more than merely subdivide the inlet and exhaust connection. In addition, they impart rotary motion to the flowing gases and permit the connections 15 and 16 to be aligned and to mate identically with all of the cylinders C¹ to C⁸.

The exhaust connection 127 in Fig. 10 comprises four ducts, each communicating with a corresponding one of the four passages in the exhaust manifold. These lead to the turbine unit 136 of the turbo-charger and the exhaust from the turbine unit passes off in the usual manner through connections 137. The centrifugal blower unit of the turbo-charger is enclosed in the housing 138 and discharges through the connection 114 to the inlet manifold 111.

In the arrangement of Fig. 10, using a turbo-charger, the turbine unit is completely effective to prevent cross-flows from the discharge end of one exhaust passage to that of another. The connection 114 may, and desirably would be subdivided into four passages each leading to a corresponding passage in manifold 111. The subdivision of connection 114 need not be helical but could be carried out as indicated in connection with Figs. 11 and 12.

Where no turbine unit is used, the subdivision into separate passages may be carried as far as is necessary to prevent disturbing cross-flow effects. Obviously subdivision need not end at the manifold shell proper.

In Fig. 11 the cylinders and inlet connections are identified as in Figs. 1–10. The engine, however, is assumed to be of the type in which the inlet flow is induced by the engine pistons, no supercharger being used. In such case, it is desirable to lengthen the individual inlet air paths, and, at the same time, minimize the differences between the lengths of the inlet paths to the various cylinders.

The shells 211 and 211A form distinct manifolds being separated by a plate 241. Each is divided into four passages by helicoidal dividers 218, 218A (see Fig. 12), and each has an intake extension 242, 242A, subdivided into four passages by the inserts 243, 243A. These inserts need not be helical and are shown as plane radial vanes. The extensions 242, 242A are shown as straight tubes but can be modified if necessary to meet limitations imposed by a particular installation. A similar exhaust arrangement is advantageous.

Reduction of the number of cylinders fed by a single extension, such as 242, secures more uniform inlet flow to the cylinders served.

The elongated subdivided paths are particularly significant in the absence of a supercharger. Where a supercharger is used, its effect is so much more intense than that of inertia of flow that the benefit attainable by extended subdivision seems small by comparison. For example, the effect of subdividing the connection 114 of Fig. 10, is small as compared to the gain secured by using the supercharger.

In considering any of the arrangements contemplated by the present invention, the timing of the valves should be kept in mind. The exhaust valve opens while the air inlet valve is closed, but the air inlet valve opens a substantial period before the exhaust valve closes and remains open a considerable period after the exhaust valve closes.

Thus the exhaust impulse in the exhaust passage builds up a high velocity flow in the outlet passage, undisturbed by cross-flows while the exhaust valve alone is open. The kinetic energy of this flow becomes effective, through the cylinder and air inlet valve to accelerate inlet air flow while both valves are open. Then, when the exhaust valve closes, the kinetic energy of this intensified flow in the inlet passage is effective to increase the charging of the cylinder.

The improvement effected solely by inertia effects is not comparable with that produced by adding a turbo-charger; but the inlet and exhaust connections above described, measurably improve the performance of a turbo-charged engine. They improve the performance of an engine lacking a supercharger, in an even more noticeable degree, probably because of the reduction of back pressure on the exhaust.

While three embodiments of the invention have been described in considerable detail, these are intended to be illustrative of the principles underlying the invention. No necessary limitation to these specific embodiments is implied. For example, the type of supercharger is not a feature of the invention though the use of a turbocharger is in line with current practice. It is not essential that the compressor be driven by an exhaust turbine. It might be driven in any of the various ways known in the art. The scoop-like extensions 17 and 31 improve the flow characteristics, but either of them can be omitted.

While the invention and particularly the reverse helix principles are peculiarly effective with four-cycle engines, the principle can be used for scavenging and supercharging of engines which operate on the two-stroke cycle.

The invention can be applied to multicylinder engines generally. For example, it may be applied to six cylinder engines by subdivision of the connections into two or three passages, three being the preferred arrangement, because there is less interference, and the provision of three passages does not require excessive space. One passage per cylinder is desirable where practicable. In the claims the phrase "individual at least to the extent that the open periods of connections to the passage do not overlap" is used to include one connection per passage as well as a larger number.

What I claim is:

1. The combination of an internal combustion engine having a plurality of cylinders each with inlet and exhaust connections which are cyclically opened and closed; means forming a group of distinct inlet passages for conducting inlet air to the inlet connections, said passages being individual at least to the extent that the open periods of inlet connections fed by one passage do not materially overlap; and means forming a group of distinct exhaust passages for conducting exhaust gases from the exhaust connections, said passages being individual at least to the extent that open periods of exhaust connections discharging into one passage do not materially overlap, the individual passages of both inlet and exhaust groups being long enough to inhibit substantial cross-flow between passages of a group, and so proportioned and arranged as to produce inertia effects favoring inlet flow toward and exhaust flow away from the cylinder.

2. The combination of an internal combustion engine having a plurality of cylinders each with inlet and exhaust connections which are cyclically opened and closed; means forming a group of distinct inlet passages for conducting inlet air to the inlet connections, said passages being individual at least to the extent that the open periods of inlet connections fed by one passage do not materially overlap, the passages of said group being long enough to inhibit substantial cross flows between passages of the group and so proportioned and arranged as to produce inertia effects favoring inlet flow toward the cylinder; means forming a group of distinct exhaust passages for conducting exhaust gases from the exhaust connections, said passages being individual at least to the extent that open periods of exhaust connections discharging into one passage do not materially overlap; a fluid pressure operated motor having individual connections with the passages of the exhaust group; and a blower driven by said motor and connected to deliver air under pressure to the passages of the inlet group.

3. The combination of a four-cycle internal combustion engine having a plurality of cylinders, each with inlet and exhaust connections which are cyclically opened and closed; means forming a group of distinct inlet passages for conducting inlet air to the inlet connections, said passages being individual at least to the extent that the open periods of inlet connections fed by one passage do not materially overlap; and means forming a group of distinct exhaust passages for conducting exhaust gases from the exhaust connections, said passages being individual at least to the extent that open periods of exhaust connections discharging into one passage do not materially overlap, the individual passages of both inlet and exhaust groups being long enough to inhibit substantial cross-flow between passages of a group and so proportioned and arranged as to produce inertia effects favoring inlet flow toward and exhaust flow away from the cylinder, and the cyclic opening and closing of the cylinder inlets and exhaust connections being such that the exhaust connection opens before the inlet connection opens and the inlet connection opens before and closes after the exhaust connection closes.

4. The combination of a four-cycle internal combustion engine having a plurality of cylinders each with inlet and exhaust connections which are cyclically opened and closed; means forming a group of distinct inlet passages for conducting inlet air to the inlet connections, said passages being individual at least to the extent that the open periods of inlet connections fed by one passage do not materially overlap, the passages of said group being long enough to inhibit substantial cross flows between passages of the group and so proportioned and arranged as to produce inertia effects favoring inlet flow toward the cylinder; means forming a group of distinct exhaust passages for conducting exhaust gases from the exhaust connections, said passages being individual at least to the extent that open periods of exhaust connections discharging into one passage do not materially overlap; a fluid pressure operated motor having individual connections with the passages of the exhaust group; and a blower driven by said motor and connected to deliver air under pressure to the passages of the inlet group, the cyclic opening and closing of the cylinder inlets and exhaust connections being such that the exhaust connection opens before the inlet connection opens and the inlet connection opens before and closes after the exhaust connection closes.

5. The combination defined in claim 1 in which the group of inlet passages and the group of exhaust passages each comprise a tubular shell subdivided into helical passages by helicoidal partitions.

6. The combination defined in claim 3 in which the group of inlet passages and the group of exhaust passages each comprise a tubular shell subdivided into helical passages by helicoidal partitions.

7. The combination defined in claim 1 in which each passage in the inlet group and each passage in the exhaust group serves two cylinders.

8. The combination defined in claim 4 in which each passage in the inlet group and each passage in the exhaust group serves two cylinders.

9. A manifold for multicylinder engines, said manifold comprising a shell structure having branch connections for connecting with respective cylinder ports, some of said branch connections, all of which are comprised within one half of the manifold, having extensions which project nearly to the center of the manifold; and a divider structure comprising a central core with helicoidal vanes subdividing the interior of the shell into passages half as numerous as the branch connections and each passage communicating with two thereof.

10. A manifold comprising a shell structure divided transversely into separable halves, each such half having branch connections for connecting with respective cylinder ports, the connections on one of said halves having extensions which project nearly to the center of the manifold; and a divider structure divided transversely into separable parts comprising a central core and helicoidal vanes subdividing the interior of the shell into passages half as numerous as the branch connections and each passage communicating with a branch connection in each half of the shell.

11. The combination defined in claim 10 in which the shell and the divider structure are each separable into two parts substantially at mid length and the sections of the divider structure are of opposite helical pitch and form a tongue and groove joint which ensures alinement.

12. The combination of an internal combustion engine having a plurality of cylinders each with inlet and exhaust connections which are cyclically opened and closed; a manifold subdivided to form distinct inlet passages for conducting air to the inlet connections, said passages being individual at least to the extent that the open periods of inlet connections fed by one passage do not materially overlap; and means forming individual entrance extensions to said passages, said extensions being so proportioned and arranged as to induce inertia effects favoring flow toward the cylinders.

13. The combination of an internal combustion engine having a plurality of cylinders each with inlet and exhaust connections which are cyclically opened and closed; at least two distinct manifolds each serving a plurality of said cylinders and each subdivided to form distinct inlet passages for conducting air to the inlet connections, said passages being individual at least to the extent that open periods of inlet connections fed by one passage do not materially overlap; and means associated with each manifold and forming individual entrance extensions to the passages thereof, said extensions being so proportioned and arranged as to induce inertia effects favoring flow toward the cylinders.

14. The combination of an internal combustion engine having a plurality of cylinders each with inlet and exhaust connections which are cyclically opened and closed; a manifold subdivided to form distinct inlet passages for conducting air to the inlet connections, said passages being individual at least to the extent that the open periods of inlet connections fed by one passage do not materially overlap; means forming individual entrance extensions to said passages so proportioned and arranged as to induce inertia effects favoring flow toward the cylinders; and means forming a group of distinct exhaust passages for conducting exhaust gases from the exhaust connections, said passages being individual at least to the extent that open periods of exhaust connections discharging into one passage do not materially overlap, the individual passages being long enough to inhibit substantial cross-flow between passages of a group.

15. The combination of an internal combustion engine having a plurality of cylinders each with inlet and exhaust connections which are cyclically opened and closed; a manifold subdivided to form distinct inlet passages for conducting air to the inlet connections, said passages being individual at least to the extent that the open periods of inlet connections fed by one passage do not materially overlap; means forming individual entrance extensions to said passages so proportioned and arranged as to induce inertia effects favoring flow toward the cylinders; means forming a group of distinct exhaust passages for conducting exhaust gases from the exhaust connections, said passages being individual at least to the extent that open periods of exhaust connections discharging into one passage do not materially overlap; a fluid pressure operated motor having individual connections with the passages of the exhaust group; and a blower driven by said motor and connected to deliver air under pressure to said entrance extensions.

16. The combination of an internal combustion engine having a plurality of cylinders each with inlet and exhaust connections which are cyclically opened and closed; a manifold subdivided to form distinct inlet passages for conducting air to the inlet connections, said passages being individual at least to the extent that the open periods of inlet connections fed by one passage do not materially overlap; means forming individual entrance extensions to said passages so proportioned and arranged as to induce inertia effects favoring flow toward the cylinders; and means forming a group of distinct exhaust passages for conducting exhaust gases from the exhaust connections, said passages being individual at least to the extent that open periods of exhaust connections discharging into one passage do not materially overlap, the individual passages being long enough to inhibit substantial cross-flow between passages of a group, and the cyclic opening and closing of the cylinder inlets and exhaust connections being such that the exhaust connection opens before the inlet connection opens and the inlet connection opens before and closes after the exhaust connection closes.

17. A manifold comprising a generally cylindrical shell having alined branch connections for connecting the respective cylinder ports, at least some of said connections having extensions which project nearly to the center of the manifold; and a divider structure comprising a central core and helicoidal vanes subdividing the interior of the shell into passages communicating with selected branch connections, said extensions fitting the passages formed by the divider, whereby the divider may be positioned in the shell by rotating it while advancing it axially.

18. A manifold for multi-cylinder engines, said manifold comprising a shell structure having alined branch connections for connecting with respective cylinder ports, the branch connections located between one end and the mid-length of the manifold having extensions which project nearly to the center of the manifold; and a divider structure comprising a central core with helicoidal vanes subdividing the interior of the shell into passages half as numerous as the branch connections, said extensions fitting the passages formed by the divider, the direction of pitch of the helicoidal vanes being reversed at mid-length of the divider structure.

19. The combination of an internal combustion engine having a plurality of cylinders each with inlet and exhaust connections which are cyclically opened and closed; means forming distinct inlet passages of substantial length for conducting inlet air to each of the inlet connections; and means forming a group of distinct exhaust passages for conducting exhaust gases from the exhaust connections, said passages being individual at least to the extent that open periods of exhaust connections discharging into any one passage do not materially overlap, the individual passages both inlet and exhaust being long enough to inhibit substantial cross-flow between the passages of the group, and so proportioned and arranged as to produce inertia effects favoring inlet flow toward and exhaust flow away from the cylinder.

20. The combination of an internal combustion engine having a plurality of cylinders each with inlet and exhaust connections which are cyclically opened and closed; means forming a group of distinct inlet passages each passage conducting inlet air to a corresponding inlet connection; and means forming a group of distinct exhaust passages for conducting exhaust gases from the exhaust connections, said passages being individual at least to the extent that open periods of exhaust connections discharging into any one passage do not materially overlap, the individual exhaust passages being long enough to inhibit substantial cross-flow between the passages of the group, and the distinct inlet passages being of such length and so proportioned as to produce inertia effects favoring flow toward the cylinders.

CHARLES G. BARRETT.